United States Patent [19]

Lenz et al.

[11] Patent Number: 4,617,370
[45] Date of Patent: Oct. 14, 1986

[54] THERMOTROPIC LIQUID CRYSTALLINE POLYMERS

[75] Inventors: Robert W. Lenz, Amherst, Mass.; Dean T. Behm, Yorktown Heights, N.Y.

[73] Assignee: The Dow Chemical Company, Midland, Mich.

[21] Appl. No.: 824,386

[22] Filed: Jan. 30, 1986

[51] Int. Cl.$^4$ .............................................. C08G 63/60
[52] U.S. Cl. ................................... 528/191; 528/176; 528/194
[58] Field of Search .................... 528/176, 191, 194

[56] References Cited

U.S. PATENT DOCUMENTS

| | | | |
|---|---|---|---|
| 3,637,595 | 1/1972 | Cottis | 528/193 |
| 3,975,487 | 8/1976 | Cottis | 264/210.6 |
| 4,118,372 | 10/1978 | Schaefgen | 528/190 |
| 4,355,133 | 10/1982 | East et al. | 528/191 X |
| 4,386,174 | 5/1983 | Cogswell et al. | 524/27 |
| 4,393,191 | 7/1983 | East | 528/207 |
| 4,499,259 | 2/1985 | Irwin | 528/190 |

FOREIGN PATENT DOCUMENTS 93891 11/1983 European Pat. Off. .

OTHER PUBLICATIONS

H. G. Weyland et al., *European Polymer Journal*, 6, 1339–1346 (1970).
Kinson and Orlando, *Journal of Applied Polymer Science*, 23, 155–162 (1979).

*Primary Examiner*—Lucille M. Phynes
*Attorney, Agent, or Firm*—Paul D. Hayhurst

[57] ABSTRACT

Thermotropic polymers containing ester linkages and having liquid crystalline properties in the molten state are prepared with certain aromatic diols, such as tetramethyl dihydroxy biphenyls having halogen substituents meta to the oxygen atoms.

20 Claims, No Drawings

THERMOTROPIC LIQUID CRYSTALLINE POLYMERS

BACKGROUND OF THE INVENTION

The present invention relates to thermotropic polyesters. More specifically, it relates to copolymers and terpolymers which exhibit optical anisotropy in the molten state.

Liquid crystalline polyesters have several advantages over polyesters which have isotropic melts. Liquid crystalline polymer melts have greatly reduced viscosities when compared to the melts of similar polymers of comparable molecular weights which are isotropic. As a result, they are more easily fabricated from the melt. Also, melts of liquid crystalline polymers orient much more readily during flow than do melts of isotropic polymers. Advantage can be taken of this facile molecular orientation to produce articles with exceptionally high mechanical strengths and stiffness.

However, those molecular features which lead to liquid crystallinity often also result in extremely high melting points. For example, poly(p-oxybenzoate), poly(p-phenylene terephthalate), and poly(p-phenylene naphthalene-2,6-dicarboxylate) all have high melting points of well over 500° C. or degrade before melting. Such high melting points are disadvantageous in that the processing of high-melting polymers is relatively more difficult and costly as compared to the processing of relatively lower-melting polymers.

It is generally known that polyesters can be prepared from aromatic dicarboxylic acids and aromatic diols. For example, European Patent application No. 93,891 discloses polyesters prepared from mixtures of biphenols such as 4,4'-dihydroxy-3,3',5,5'-tetramethyl biphenyl, and dicarboxylic acid derivatives, such as terephthaloyl dichloride optionally with isophthaloyl dichloride. The examples of European Patent application No. 93,891 disclose polymers having Tg's of from 304° to 332° C. H. G. Weyland et al., in *European Polymer Journal*, 6, 1339–1346 (1970) disclose polyesters prepared from various diacids and biphenols, including 4,4'-dihydroxy-3,3',5,5'-tetramethyl biphenyl. At page 1343 Weyland indicates that methyl or phenyl groups positioned adjacent to the oxygen atoms of the biphenols increase the Tg of the polymers relative to polymers having hydrogen atoms in the same positions, i.e., replacing certain biphenol hydrogen atoms with methyl or phenyl moieties results in an increased Tg. Weyland further indicates that the melting point, Tm, follows the approximate relationship $Tg/Tm = \frac{2}{3}$.

It is also known to prepare polyesters from aromatic diols, aromatic diacids, and hydroxybenzoates, as taught in U.S. Pat. Nos. 3,975,487 and 3,637,595 to Cottis. The latter patent broadly teaches that the aromatic rings of these polymers preferably are unsubstituted, but can have one to three substituents, such as Cl, Br, F, lower alkyl and lower alkoxy, which do not materially alter the physical and chemical characteristics of the polyesters described therein.

U.S. Pat. No. 4,118,372 is somewhat similar to the two Cottis patents, but broadly discloses that certain aromatic rings can be substituted with one or more Cl, Br, F or $C_{1-4}$ alkyl moieties. The disclosed polymers display optical anisotropy in the molten state, and preferably have flow temperatures of from 200° C. to 375° C.

Heretofore, a liquid crystalline polyester having a relatively low melting point has not been prepared using a tetraalkyl biphenol having halogen substitution in the meta position of the aromatic ring(s) relative to the hydroxyl groups.

SUMMARY OF THE INVENTION

The invention is a thermotropic polymer capable of forming an anisotropic melt, the polymer comprising ester linkages and at least one recurring unit derived from a polysubstituted, tetraalkyl biphenol having at least one non-hydrogen substituent in a meta position relative to an oxygen atom on the same aromatic ring.

Said polymers generally have lower melting points than corresponding polymers prepared using unsubstituted biphenols.

The polymers of the present invention are useful in the preparation of high strength fibers, films, and molded articles which retain useful properties at high temperatures.

DETAILED DESCRIPTION OF THE INVENTION

Polyesters of the present invention can be prepared from aromatic diols, aromatic dicarboxylic acids, and aromatic hydroxylated carboxylic acids using known techniques.

The hydroxyaromatic carboxylic acid component and the aromatic dicarboxylic acid component of the polymers of the present invention can be selected from the wide number of said compounds. The carboxylic acid moieties optionally can be in the ester form, and mixtures of acids and esters can be employed. The hydrogen atoms of the hydroxyl moieties can be replaced with acyl moieties, as is well-known, and this is preferred. The hydroxyl hydrogen preferably is replaced with an acetyl moiety. Examples of typical hydroxyaromatic carboxylic acids and esters thereof include para-hydroxybenzoic acid, phenyl-para-hydroxybenzoate, para-acetoxybenzoic acid, para-acetoxycinammic acid, isobutyl-para-acetoxybenzoate, 6-hydroxy-2-naphthoic acid, and 6-acetoxy-2-naphthoic acid.

Examples of typical aromatic dicarboxylic acids and derivatives thereof include isophthalic acid, terephthalic acid, diphenylterephthalate, diethylisophthalate, methylethylterephthalate, the isobutyl half ester of terephthalic acid, 2,5-dichloroterephthalic acid, hexahydroterephthalic acid, 1,4- and 2,5-dimethyl-transhexahydroterephthalic acid, 4,4'-stilbene dicarboxylic acid, 2,6-naphthalene dicarboxylic acid and the like.

The diol component of the polymer of the present invention preferably is derived from a polyhalo, tetraalkyl biphenol having at least one halogen atom in a meta position relative to an oxygen atom on the same aromatic ring. Preferred diol recurring units are represented generally by the formula:

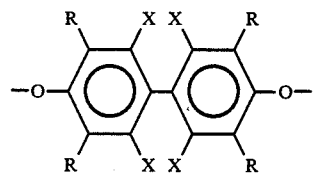

wherein each R independently is phenyl or lower alkyl or lower alkoxy of up to about four carbon atoms, and each X independently is a moiety which will electrophilically substitute into the position depicted for X in the formula with the proviso that at least one X is not H. Preferably, each R is methyl. Preferred X moieties include Cl, Br, F, lower alkyl, H, sulfonate, or acyl. More preferably, each X independently is Cl, Br, H or F. Most preferably, each X independently is H or Br. A class of most preferred polymers is that in which at least two X moieties are Br, and includes those polymers wherein at least three X moieties are Br, and those wherein each X is Br. The acylated form of the diol preferably is employed, with the diacetylated form being most preferred.

As previously stated, it is well-known to prepare polyesters. Accordingly, further examples of suitable dicarboxylic acid and hydroxylated carboxylic acid components as well as ratios of components and reaction conditions are incorporated herein by reference from the teaching of the following U.S. Pat. Nos.: 3,637,595; 3,975,487; and 4,118,372. Additionally, the teachings of European Patent application No. 93,891 are incorporated herein by reference.

When the aromatic monomeric components as described hereinabove are reacted under known conditions to form a polymer having ester linkages, a polymer of the present invention is formed. Preferred polymers of the present invention are represented generally by the formula:

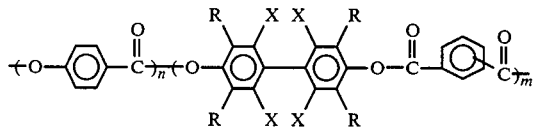

wherein X and R are as described hereinabove, and wherein $n+m=1$, with m preferably being from about 0.1 to about 0.5. Preferably, the molar ratio of isophthalic acid remnants to terephthalic acid remnants is up to about 1. Melting points for the preferred polymers range from about 250° C. up to about 400° C., and preferably are from about 270° C. to about 350° C.

SPECIFIC EMBODIMENTS

The following examples are given to illustrate the invention and should not be construed as limiting its scope. All parts and percentages are by weight unless otherwise indicated.

EXAMPLE 1

A polymerization/distillation (pol/dis) apparatus is charged with the following compounds: 2.7 g p-acetoxybenzoic acid (0.015 mole); 4.2225 g of the diacetate of 2,2',6,6'-tetramethyl-3,3,5-tribromo-4,4'-biphenyl-1,1'-diol (0.0075 mole); 0.996 g of terephthalic acid (0.006 mole); 0.249 g of isophthalic acid (0.0015 mole); and 0.03 g of sodium acetate. The apparatus is equipped with a small distillation head, a gas inlet tube, and a heating means. The apparatus is flushed several times with dry nitrogen and is evacuated after each flush. The contents of the flask are stored under a slight nitrogen overpressure prior to polymerization.

Polymerization is initiated by heating the flask to 230° C. As the monomers melt together and the mixture becomes thicker, acetic acid begins to distill through the distilling head, which is wrapped with heating tape to prevent large amounts of monomer from subliming inside of the head. The temperature is kept at 230° C. for 1.5 hours, then the temperature is increased to 250° C. and a vacuum simultaneously is gradually applied to the apparatus. A full vacuum (<0.2 mm Hg) is attained at the end of 0.75 hour, whereupon the temperature is increased to 275° C. for an additional 20 minutes.

The apparatus is then cooled while under vacuum and the polymer is scraped from the flask.

EXAMPLE 2

A polymerization/distillation (pol/dis) apparatus is charged with the following compounds: 2.025 g of p-acetoxybenzoic acid (0.01125 mole); 2.4075 g of the diacetate of 2,2',6,6'-tetramethyl-3,3',5,5'-tetrabromo-4,4'-biphenyl-1,1'-diol (0.00375 mole); 0.3113 g of terephthalic acid (0.001875 mole); 0.3113 g of isophthalic acid (0.001875 mole) and 0.03 g of sodium acetate.

The procedure of Example 1 is followed with the following exceptions. The initial temperature of polymerization is 215° C. for 0.5 hour. The temperature is then increased to 230° C. for 1 hour. After 0.5 hour a full vacuum is attained and the temperature is further increased to 300° C. and is maintained for 20 minutes.

EXAMPLE 3

The procedure of Example 2 is repeated except that the following amounts of materials are employed: 2.7 g of p-acetoxybenzoic acid (0.015 mole); 4.2225 g of the diacetate of 2,2',6,6'-tetramethyl-3,3',5-tribromo-4,4'-biphenyl-1,1'-diol (0.0075 mole); 1.245 g of terephthalic acid (0.0075 mole); no isophthalic acid. All else is the same.

Samples of the polymers of Examples 1, 2 and 3 are subjected to differential scanning calorimetry. The results are summarized in Table I.

TABLE I

| Sample | Cycle | Peak End | Peak Max/Min |
|---|---|---|---|
| Ex. 1 | Heat | 372 | 326 |
| Ex. 2 | Heat | 354 | 341 |
|  | Cool | 264 | 290 |
| Ex. 3 | Heat | 334 | 322 |
|  | Cool | 261 | 273 |

COMPARATIVE EXPERIMENT 1

Copolyesters are prepared using the diacetates of tribromo and tetrabromo tetramethyl biphenols, and terephthalic acid optionally using isophthalic acid. The polymerization procedure employed in Runs 1-8 is similar to the procedure of Examples 1-3 except that no hydroxyaromatic carboxylic acid component is employed. The melting points of these polymers are listed in Table II.

TABLE II

Melting Points for Polyesters Prepared Using Tri- and Tetrabromo tetramethyl biphenols

| Run | Number of Bromine Atoms | Ter/Iso[1] | Tm (°C.) | Comments[2] |
|---|---|---|---|---|
| 1 | 3 | 1:0 | 290 | dec |
| 2 | 3 | 4:1 | 285 | iso |
| 3 | 3 | 2:1 | 275 | iso |
| 4 | 3 | 1:1 | 280 | iso |
| 5 | 4 | 1:0 | 340 | dec |
| 6 | 4 | 4:1 | 328 | dec |
| 7 | 4 | 2:1 | 325 | iso/dec |

TABLE II-continued
Melting Points for Polyesters Prepared Using Tri- and Tetrabromo tetramethyl biphenols

| Run | Number of Bromine Atoms | Ter/Iso[1] | Tm (°C.) | Comments[2] |
|---|---|---|---|---|
| 8 | 4 | 1:1 | 245 | iso |

[1]molar ratio of terephthalic to isophthalic moieties. Diol to diacid molar ratio is 1:1.
[2]dec = decomposes as it melts
iso = forms an isotropic melt As can be seen from Table II, polymers prepared without a hydroxyaromatic carboxylic acid do not form thermotropic liquid crystalline melts.

What is claimed is:

1. A thermotropic polymer capable of forming an anisotropic melt, the polymer comprising at least one recurring unit selected from each of the following groups:
   (a) a remnant of at least one aromatic dicarboxylic acid;
   (b) aromatic dioxy moieties of the formula:

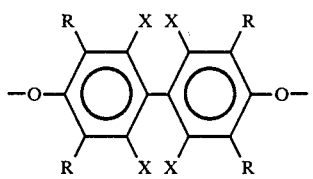

wherein each R independently is phenyl or lower alkyl or lower alkoxy of up to about four carbon atoms, and each X independently is a moiety which will electrophilically substitute into the position depicted for X in the formula, with the proviso that at least one X is not H; and
   (c) a remnant of at least one hydroxyaromatic carboxylic acid;
   the units being selected such that the polymer has a melting point of from about 250° C. to about 400° C.

2. The polymer of claim 1 wherein each X independently is Cl, Br, F, alkyl, H, sulfonate, or acyl.

3. The polymer of claim 2 wherein each X independently is H, Cl, Br or F.

4. The polymer of claim 3 wherein each X independently is H or Br.

5. The polymer of claim 4 wherein at least two X moieties are Br.

6. The polymer of claim 4 wherein at least three X moieties are Br.

7. The polymer of claim 5 wherein each X is Br.

8. An anisotropic melt of the polymer of claim 4.

9. The polymer of claim 1 wherein the remnant of the hydroxyaromatic carboxylic acid is represented by the formula:

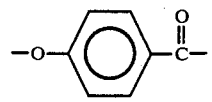

with the proviso that the phenyl ring optionally can bear inert substituents.

10. The polymer of claim 1 wherein the remnant of the dicarboxylic acid is represented by the formula:

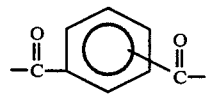

with the proviso that the ring carbonyl substituents be meta or para with respect to each other.

11. An anisotropic melt of the polymer of claim 1.

12. A thermotropic polymer capable of forming an anisotropic melt, the polymer being represented generally by the formula:

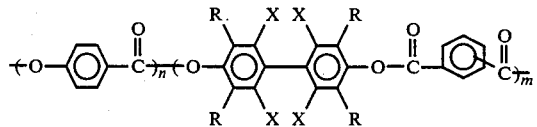

wherein the sum of n and m is one, each R independently is lower alkyl or lower alkoxy of up to about four carbon atoms, or phenyl, and each X independently is a moiety which will electrophilically substitute into the position depicted for X in the formula, with the proviso that at least one X is not H.

13. The polymer of claim 12 wherein n is at least about 0.5.

14. The polymer of claim 13 wherein n is from about 0.5 to about 0.9.

15. The polymer of claim 14 wherein at least two X moieties are Br.

16. The polymer of claim 14 wherein at least three X moieties are Br.

17. The polymer of claim 14 wherein each X is Br.

18. The polymer of claim 17 wherein each R is methyl.

19. The polymer of claim 12 having a melting point of from about 250° C. to about 400° C.

20. A thermotropic polymer capable of forming an anisotropic melt, the polymer comprising ester linkages and at least one recurring unit derived from a polysubstituted, tetraalkyl biphenol having at least one non-hydrogen substituent in a meta position relative to an oxygen atom on the same aromatic ring.

* * * * *